(12) United States Patent
Graham

(10) Patent No.: US 7,162,858 B2
(45) Date of Patent: Jan. 16, 2007

(54) PUSH-PULL CABLE AND METHOD OF MANUFACTURING THEREOF

(75) Inventor: Dennis Graham, Reading, PA (US)

(73) Assignee: Teleflex Incorporated, Limerick, PA (US)

(*) Notice: Subject to any disclaimer, the term of this patent is extended or adjusted under 35 U.S.C. 154(b) by 0 days.

(21) Appl. No.: 11/133,217

(22) Filed: May 20, 2005

(65) Prior Publication Data
US 2006/0260288 A1 Nov. 23, 2006

(51) Int. Cl.
D07B 1/00 (2006.01)
(52) U.S. Cl. .......................................... 57/213
(58) Field of Classification Search .................. 57/213, 57/214, 217, 218, 221, 223
See application file for complete search history.

(56) References Cited

U.S. PATENT DOCUMENTS

| | | | |
|---|---|---|---|
| 4,193,319 A | 3/1980 | Langford | 74/501 |
| 4,300,408 A | 11/1981 | Yoshifuji | |
| 4,471,711 A | 9/1984 | Graham | 116/216 |
| 4,667,462 A * | 5/1987 | Smyth | 57/217 |
| 4,730,510 A | 3/1988 | Graham | 74/502 |
| 5,351,470 A * | 10/1994 | Shinmura | 57/213 |
| 5,449,861 A * | 9/1995 | Fujino et al. | 174/113 A |
| 5,806,296 A * | 9/1998 | Kaneko et al. | 57/206 |
| 6,078,010 A | 6/2000 | Funahashi et al. | 174/126.1 |
| 6,194,666 B1 | 2/2001 | Hayashida et al. | 174/128.1 |
| 6,209,415 B1 | 4/2001 | Uneme et al. | 74/502.5 |
| 6,276,120 B1 | 8/2001 | Adriaensen et al. | |
| 6,338,287 B1 | 1/2002 | Uneme et al. | 74/502.5 |
| 6,347,561 B1 | 2/2002 | Uneme et al. | 74/502.5 |
| 6,385,957 B1 * | 5/2002 | Misrachi | 57/221 |
| 6,405,774 B1 * | 6/2002 | Komatsu | 152/556 |
| 2003/0196508 A1 | 10/2003 | Uenaka et al. | |

* cited by examiner

Primary Examiner—Shaun R. Hurley
(74) Attorney, Agent, or Firm—Baker & Hostetler LLP

(57) ABSTRACT

A push-pull cable is provided. The cable includes a central wire, a first set of wires wrapped around the central wire, and a second set of wires wrapped around the first set of wires. A coating is then formed around the second set of wires. Also provided is a method for manufacturing such a wire.

18 Claims, 3 Drawing Sheets

PUSH-PULL CABLE AND METHOD OF MANUFACTURING THEREOF

FIELD OF THE INVENTION

The present invention relates generally to cables and methods for manufacturing cables. More particularly, the present invention relates to push-pull cables and methods of manufacturing push-pull cables.

BACKGROUND OF THE INVENTION

Push-pull cables are commonly included in automatic transmission shifters, mechanical latches, hydraulic valve control operations and many other currently-available devices. A typical push-pull cable, such as an automatic transmission shift cable, allows for back and forth movements of one or more components inside of a casing.

FIG. 1 is a cross-sectional view illustrating the central portion of a push-pull cable according to the prior art. More specifically, FIG. 1 illustrates the central portion or core of a 1×13 push-pull cable according to the prior art. As illustrated in FIG. 1, a central wire 2 is surrounded by twelve peripheral wires 4. The peripheral wires 4, in turn, are surrounded by a flat wrap 6. Also, the flat wrap 6 is surround by an outer-coating 8.

Other components, which are not illustrated in FIG. 1, are arranged about the outer-coating 8 to make up the rest of the push-pull cable. By definition, the push-pull cable itself is capable of supporting both a tensile load and a compressive load.

The components illustrated in FIG. 1 are commonly found in 40-series push-pull cables, which have standardized dimensions that are easily obtainable by those of skill in the art. Within those dimensions, a 40-series cable can be designed to support a certain range of loads in tension and in compression for a range of distances of travel. However, what is needed are alternate push-pull cables that can support additional loads, both in tension and in compression, and which can withstand cyclic loading for a larger number of cycles under high loads.

SUMMARY OF THE INVENTION

The foregoing needs are met, to a great extent, by the present invention wherein, in one aspect thereof, a push-pull cable capable of providing a reliable interface between two mechanical objects to provide both tensile and compressive linking is provided. The cable includes a central wire capable of supporting both a tensile load and a compressive load. The cable also includes a first set of wires that are wrapped around the central wire. The cable further includes a second set of wires that are wrapped around the first set of wires. Also, in the cable, wires in the first set of wires are in contact with wires in the second set of wires.

A method of manufacturing a push-pull cable capable of providing a reliable interface between two mechanical objects to provide both tensile and compressive linking is also provided. The method includes wrapping a first set of wires around a central wire, wherein the central wire is capable of supporting both a tensile load and a compressive load. The method also includes wrapping a second set of wires around the first set of wires, wherein the second set of wires is in contact with the first set of wires.

Another push-pull cable capable of providing a reliable interface between two mechanical objects to provide both tensile and compressive linking is also provided. The cable includes a first supporting means for supporting both a tensile load and a compressive load. The cable also includes a second supporting means for further supporting the tensile load and the compressive load, wherein the second supporting means is wrapped around the first supporting means. The cable further includes a third supporting means for even further supporting the tensile load and the compressive load, wherein the third supporting means is in contact with and wrapped around the second supporting means.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
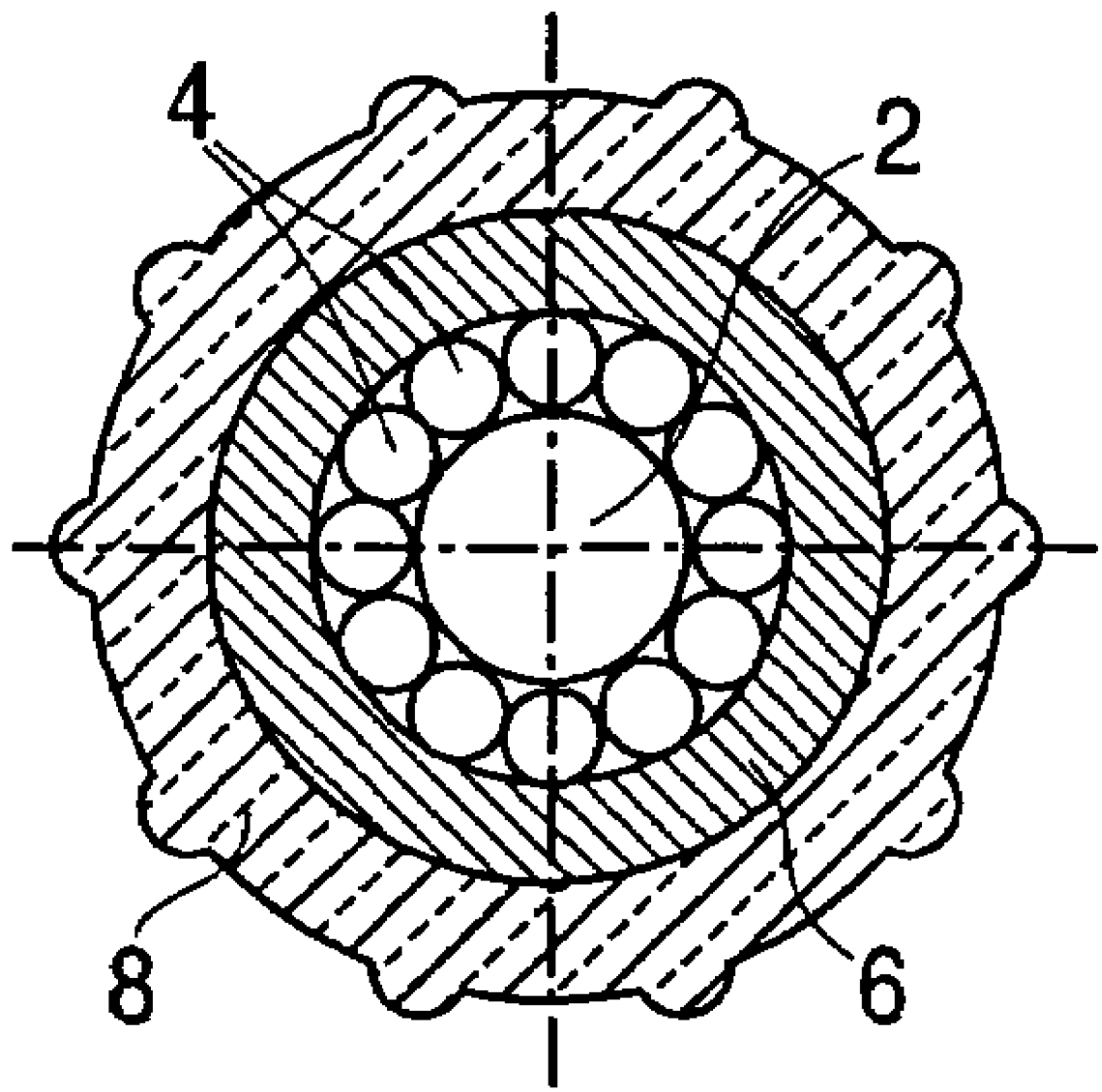
FIG. 1 is a cross-sectional view illustrating the central portion of a push-pull cable according to the prior art.

At least in view of the above-mentioned need for novel push-pull cables that can support additional loads and/or that can withstand a large amount of cyclic loading under high loads, new push-pull cables and methods of manufacturing such cables have been developed. Embodiments of the present invention will now be described with reference to the drawing figures, in which like reference numerals refer to like parts throughout.

Figure 2:
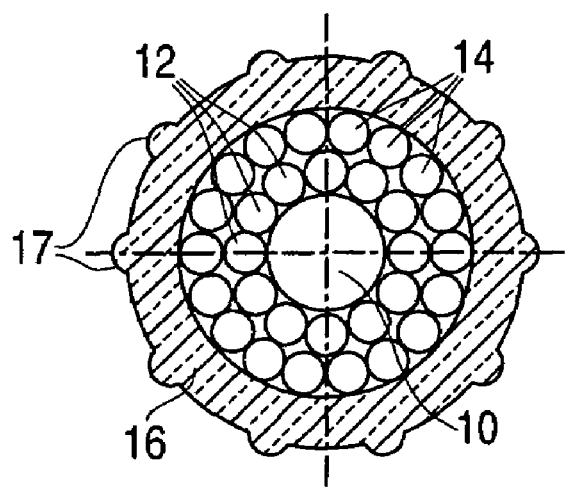
FIG. 2 is a cross-sectional view of the central portion of a push-pull cable according to certain embodiments of the present invention.

FIG. 2 is a cross-sectional view of the central portion of a push-pull cable according to certain embodiments of the present invention. Push-pull cables into which the components illustrated in FIG. 2 may be incorporated are typically capable of providing a reliable interface between two mechanical objects to provide both tensile and compressive linking. For example, such push-pull cables may be positioned between a transmission control in the cab of a truck and the shift lever on an automatic transmission in the truck.

A portion of an exemplary push-pull cable, illustrated in FIG. 2, includes a central wire 10, which is capable of supporting both a tensile load and a compressive load. Although no particular restrictions are placed on what the central wire 10 is made of, it is commonly made of steel (e.g., galvanized steel, such as AISI 1055). Further, when incorporated into a 40-series cable, the central wire 10 is often chosen to have a diameter of approximately 0.055 inches. (Note: Throughout this specification, all sizes of particular embodiments are approximate and subject to variations in both design and manufacturing.)

Around the central wire 10 are positioned wires, typically in a helix, that make up a first set of wires 12. Although the first set of wires 12 is illustrated in FIG. 2 as being in contact with the central wire 10, intermediate components may be included between the central wire 10 and the first set of wire 12 according to certain embodiments of the present invention. For example, a thin layer of epoxy, insulation or lubricant might be placed between the central wire 10 and the first set of wires 12.

Although 12 wires are illustrated as forming the first set of wires 12 in FIG. 2, no particular restrictions are placed on the number of wires that may be included in the first set of wires 12. For example, according to certain embodiments, between 8 and 16 wires can be used while between 9 and 15 wires can be used according to certain other embodiments.

Although the wires in the first set of wires 12 may be made from any material (e.g., metals, ceramics, polymers), the wires in the first set of wires 12 are often made of steel (e.g., aircraft quality galvanized steel such as AISI 1065). An approximate diameter of 0.019 inches is typically chosen for each of the wires in the first set of wires 12 when manufacturing a 40-series push-pull cable. However, wires of many other geometries are also within the scope of the present disclosure. Also, all of the wires in the first set of wires 12 need not have substantially identical geometries or diameters. Further, when the wires are positioned in a helix, the helix may be of a right-hand or left-hand lay.

Figure 3:
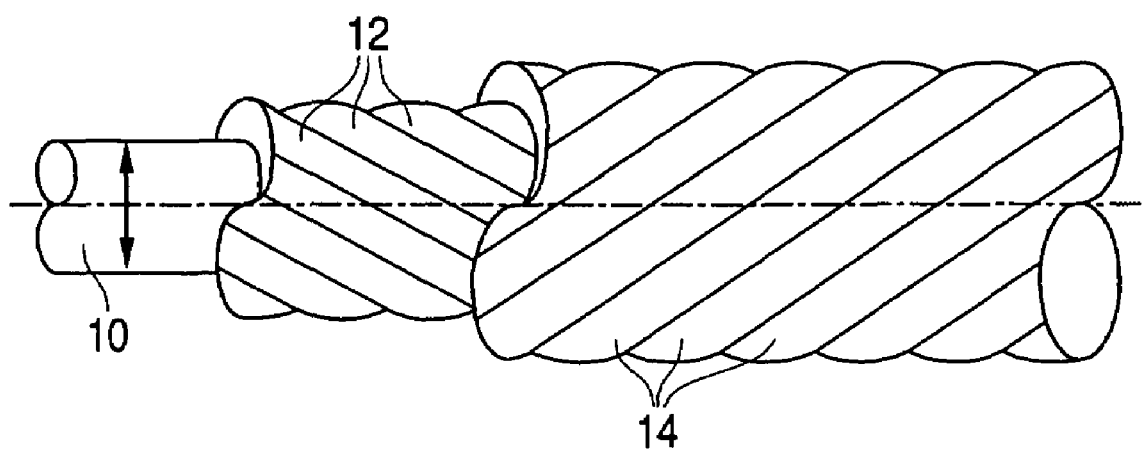
FIG. 3 is a side view of a cut-away section of the push-pull cable illustrated in FIG. 2.

As mentioned above, the wires in the first set of wires 12 are typically wrapped in a helix around the central wire 10. This configuration is further illustrated in FIG. 3, which offers a side view of a cut-away section of the push-pull cable illustrated in FIG. 2. As shown in FIG. 3, the wires in the set of wires 12 are generally wrapped in either a right- or left-handed direction. However, the wires may be wrapped in alternate manners or, according to certain embodiments, may even be positioned parallel to the central wire 10.

Generally, the components illustrated in FIG. 2 are incorporated into at least one of a 20-series push-pull cable, a 30-series push-pull cable, a 40-series push-pull cable, a 60-series push-pull cable or an 80-series push-pull cable. However, other push-pull cable geometries that would benefit from incorporating the components illustrated in FIG. 2 are also within the scope of the present invention.

As further illustrated in FIGS. 2 and 3, wrapped around the first set of wires 12 are wires that make up the second set of wires 14. Typically, the second set of wires 14 is in direct contact with the first set of wires 12. However, this is not particularly limiting of the present invention and intermediate components may be positioned between the wires in the first set of wires 12 and the second set of wires 14.

As illustrated in FIG. 3, when the first set of wires 12 is wrapped in a first direction (e.g., a right-handed direction), the second set of wires 14 may be wrapped in a second direction that is different from the first direction (e.g., a left-handed direction). However, push-pull cables wherein the first set of wires 12 and the second set of wires 14 are wrapped in the same or substantially the same direction are also within the scope of the present invention.

In FIG. 2, eighteen wires are illustrated as being included in the second set of wires 14. However, no particular restrictions are placed on the number of wires that may be included in the second set of wires 14 according to the present invention. For example, according to certain embodiment, between 14 and 22 wires can be included and, according to other embodiments, between 15 and 21 wires can be included in the second set of wires 14.

As with the first set of wires 12, no particular restrictions are placed on the geometries of the wires in the second set of wires 14. However, according to certain embodiments of the present invention, each wire in the first set of wires 12 and the second set of wires 14 can have substantially equal diameters. Further, the wires in the first set of wires 12 and the second set of wires 14 can be made from identical or similar materials such as steel, aluminum, etc.

It should be noted that, although the wires illustrated in FIG. 2 as making up the first set of wires 12 and the second set of wires 14 have circular cross sections, other cross sectional geometries are also within the scope of the present invention. For example, the cross sections may be oval or octagonal.

As further illustrated in FIG. 2, a coating 16 surrounds the second set of wires 14. The coating 16 may be made of virtually any material, but nylons (e.g., Nylon 11 or Nylon 66) are often included in the coating 16. Also, although the coating 16 is illustrated in FIG. 2 as being in direct contact with the second set of wires 14, intermediate components may be included between the second set of wires 14 and the coating 16.

No particular restrictions are placed on the geometry of the coating 16. However, when incorporated in a 40-series push-pull cable, the coating 16 is often chosen to have an outer diameter of approximately 3/16". Optionally, splines 17 may be formed on the outside of coating 16. Splines 17 may be used, for example, to more easily position the components illustrated in FIG. 2 within a push-pull cable.

In addition to those discussed above in connection with FIGS. 2 and 3, other embodiments of push-pull cables are within the scope of the present invention. Typically, these cables are again capable of providing a reliable interface between two mechanical objects to provide both tensile and compressive linking. According to some embodiments of such cables, a first supporting means for supporting both a tensile load and a compressive load are included in the cable. The first supporting means can take the form of, for example, the central wire 10 in FIG. 2.

A second supporting means for further supporting the tensile load and the compressive load is then typically wrapped around the first supporting means. An example of such second supporting means is exemplified as the first set of wires 12 in FIG. 2. According to certain embodiments of the present invention, the second supporting means includes about 12 wires, ±4 wires. However, configurations with additional or fewer wires are also within the scope of the present invention.

Third supporting means for even further supporting the tensile load and the compressive load are also often included in certain embodiments of the present invention. The third supporting means is typically in contact with and wrapped around the second supporting means. Also, the third supporting means is often trapped within an outer coating that may be used to support the third supporting means in compressive loading. A representative third supporting means is illustrated in FIG. 2 as the second set of wires 14.

According to certain embodiment of the present invention, the second supporting means is wrapped in a first direction (e.g., a left-handed direction) and the third supporting means is wrapped in a second direction (e.g., a right-handed direction) that is different from the first direction. Also, the third supporting means often includes about 18 wires, +4 wires. However, configurations with fewer and additional wires are also within the scope of the present invention.

The second supporting means and the third supporting mean may each include wires that are of substantially equal diameter and geometries. However, this is not particularly limiting of the present invention. Further, all of the above-mentioned supporting means may be included in 20-series push-pull cables, 30-series push-pull cables, 40-series push-pull cables, 60-series push-pull cables or 80-series push-pull cables. However, other push-pull cable configurations may also include any or each of the above-discussed means and still be within the scope of the present invention.

Figure 4:
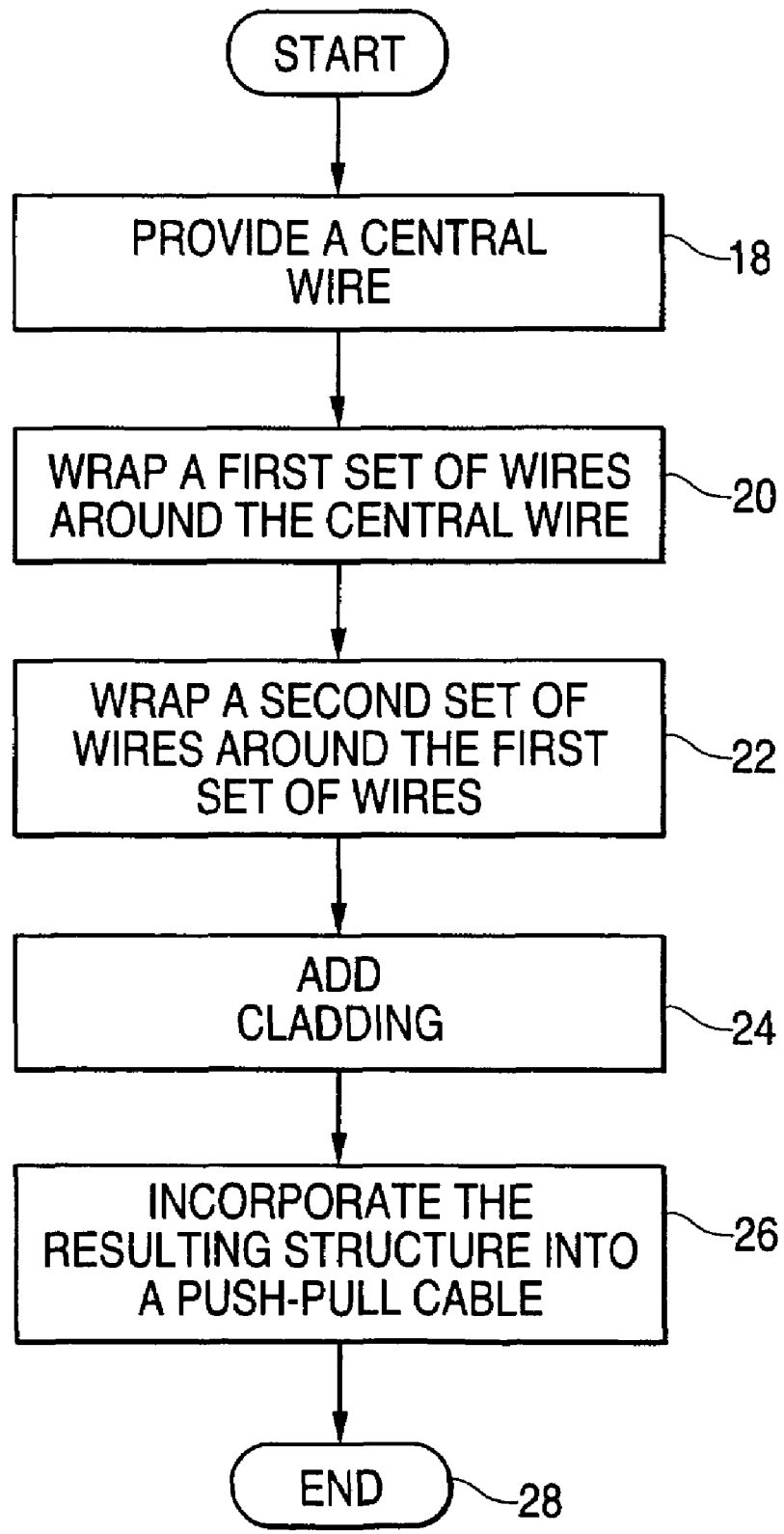
FIG. 4 is a flowchart illustrating steps that may be followed in accordance with certain embodiments of a method or process according to the present invention.

FIG. 4 is a flowchart illustrating steps that may be followed in accordance with certain embodiments of a method or process according to the present invention. More specifically, FIG. 4 includes the steps of a method of manufacturing a push-pull cable capable of providing a reliable interface between two mechanical objects to provide both tensile and compressive linking.

The process starts in step 18 of the flowchart in FIG. 4, where a central wire such as the central wire 10 in FIG. 2 is provided. Typically, the central wire is capable of supporting both a tensile load and compressive load. Next, in step 20, a first set of wires (e.g., the first set of wires 12) can be wrapped around the central wire of step 18.

According to certain embodiments of the present invention, the first set of wires are wrapped around in a first direction, such as a right-handed direction. Also, as mentioned above, the first set of wires can include at least 8 wires. However, high numbers (e.g., 9, 12, 15, 16) are also within the scope of the present disclosure. The process continues to step 22.

In step 22, a second set of wires (e.g., the second set of wires 14 of FIG. 2) can be wrapped around the first set of wires. Typically, the second set of wires is in contact with the first set of wires after being wrapped. However, this is not particularly limiting of the present invention and intermediate components may be present between the first set of wires and the second set of wires.

Commonly, the wires in the second set of wires are wrapped in a second direction that is different from the first direction in which the wires in the first set of wires are wrapped. For example, the second set of wires may be wrapped in a left-hand direction whereas the first set of wires are wrapped in a right-hand direction. According to certain embodiments of the present invention, at least 14 wires can be wrapped as the second set of wires. However, higher and lower numbers of wires (e.g., 15, 18, 21, 22) may also make up the second set of wires according to the present invention.

Steps 20 and 22 may include wrapping individual wires of substantially equal diameters and/or geometries. However, no particular restrictions are placed on the geometries of the wires nor on the types of materials that may be used to make the wires. Nonetheless, according to certain embodiment of the present invention, the wires can be made of galvanized steel and have diameters of approximately 0.019 inches when incorporated into 40-series push-pull cables. The process continues to step 24.

In step 24, a coating, such as the coating 16 shown in FIG. 2, can be added. Typically, such a coating can be added about the second set of wires. Also, such a coating can be typically made of nylon (e.g., Nylon 11). However, these issues are not particularly limiting of the present disclosure. On the other hand, when making a 40-series push-pull cable, the coating is usually formed to have an outer diameter of approximately ³⁄₁₆", but thicker or thinner coatings may also be used. In addition, splines may be included on the outside of the coating, regardless of the type of push-pull cable being manufactured. The process continues to step 26.

In step 26, the resultant structure created by the previous steps can be incorporated into a push-pull cable. Any method known or that becomes apparent to one of skill in the art upon practicing the present disclosure may be used to perform step 26. For example, additional layers may be formed on the outside of components illustrated in FIG. 2 or the components illustrated in FIG. 2 may be pushed or pulled into the middle of additional components that make up push-pull cables. Control proceeds to step 28, where the process stops.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A push-pull cable capable of providing a reliable interface between two mechanical objects to provide both tensile and compressive linking, the cable comprising:
    a central wire capable of supporting both a tensile load and a compressive load;
    a first set of wires wrapped around the central wire, wherein a first wire in the first set of wires and a second wire in the first set of wires are positioned at a substantially equal radial distance from an outer surface of the central wire at a perpendicular cross-section taken at a first location along a longitudinal axis of the central wire; and
    a second set of wires wrapped around the first set of wires, wherein the first set of wires is in contact with the second set of wires.

2. The push-pull cable of claim 1, wherein the first set of wires is wrapped in a first direction, and wherein the second set of wires is wrapped in a second direction that is different from the first direction.

3. The push-pull cable of claim 1, wherein the first set of wires comprises at least 8 wires.

4. The push-pull cable of claim 1, wherein the second set of wires comprises at least 14 wires.

5. The push-pull cable of claim 1, wherein each wire in the first set of wires has a substantially equal diameter.

6. The push-pull cable of claim 1, wherein the first set of wires and the second set of wires each comprises individual wires of substantially equal diameters.

7. The push-pull cable of claim 1, further comprising:
    a coating surrounding the second set of wires, wherein the coating comprises nylon and wherein the central wire comprises steel.

8. A method of manufacturing a push-pull cable capable of providing a reliable interface between two mechanical objects to provide both tensile and compressive linking, the method comprising:

wrapping a first set of wires around a central wire, wherein the central wire is capable of supporting both a tensile load and a compressive load and wherein a first wire in the first set of wires and a second wire in the first set of wires are positioned at a substantially equal radial distance from an outer surface of the central wire at a perpendicular cross-section taken at a first location along a longitudinal axis of the central wire; and wrapping a second set of wires around the first set of wires, wherein the second set of wires is in contact with the first set of wires.

9. The method of claim 8, further comprising:

wrapping the first set of wires in a first direction; and
wrapping the second set of wires in a second direction that is different from the first direction.

10. The method of claim 8, wherein the wrapping the first set of wires step includes wrapping at least 8 wires.

11. The method of claim 8, wherein the wrapping the second set of wires step includes wrapping at least 14 wires.

12. The method of claim 8, wherein the wrapping the first set of wires step and the wrapping the second set of wires step each comprise wrapping individual wires of substantially equal diameters.

13. The method of claim 8, further comprising:

adding a coating about the second set of wires.

14. A push-pull cable capable of providing a reliable interface between two mechanical objects to provide both tensile and compressive linking, comprising:

a first supporting means for supporting both a tensile load and a compressive load;

a second supporting means for further supporting the tensile load and the compressive load, wherein the second supporting means is wrapped around the first supporting means and wherein a first component and a second component in the second supporting means are positioned at a substantially equal radial distance from an outer surface of the first supporting means at a perpendicular cross-section taken at a first location along a longitudinal axis of the first supporting means; and a third supporting means for even further supporting the tensile load and the compressive load, wherein the third supporting means is in contact with and wrapped around the second supporting means.

15. The push-pull cable of claim 14, wherein the second supporting means is wrapped in a first direction and wherein the third supporting means is wrapped in a second direction that is different from the first direction.

16. The push-pull cable of claim 14, wherein the second supporting means comprises about 12 wires.

17. The push-pull cable of claim 14, wherein the third supporting means comprises about 18 wires.

18. The push-pull cable of claim 14, wherein the second supporting means and the third supporting means each comprises wires of substantially equal diameters.

* * * * *